June 13, 1939.  F. D. JONES ET AL  2,162,506
SIDE DELIVERY RAKE
Filed Aug. 7, 1936  2 Sheets—Sheet 2
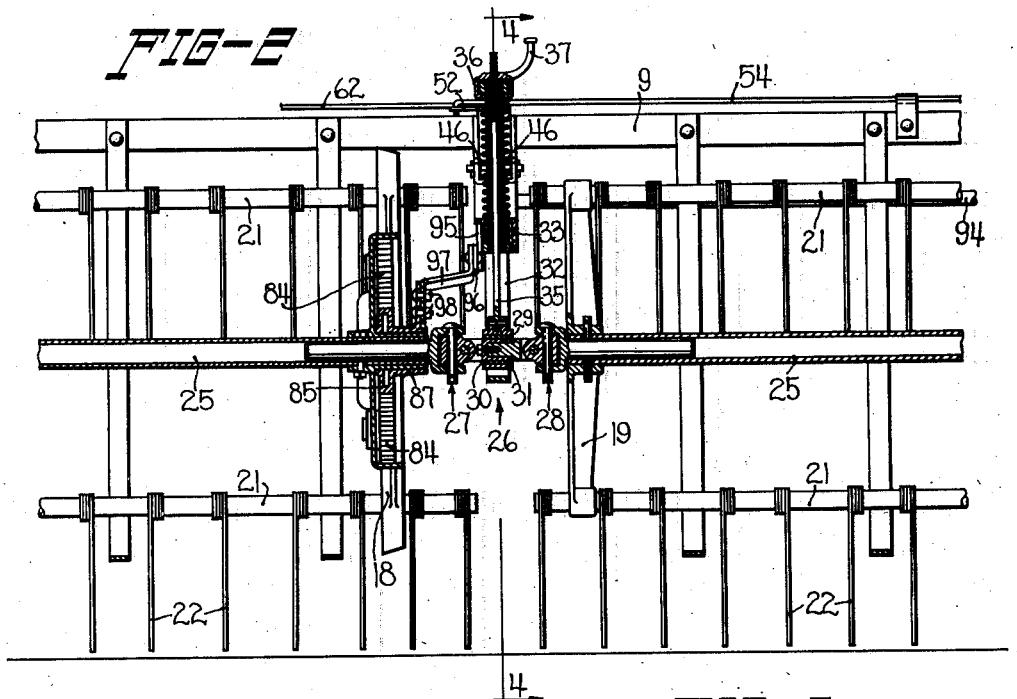
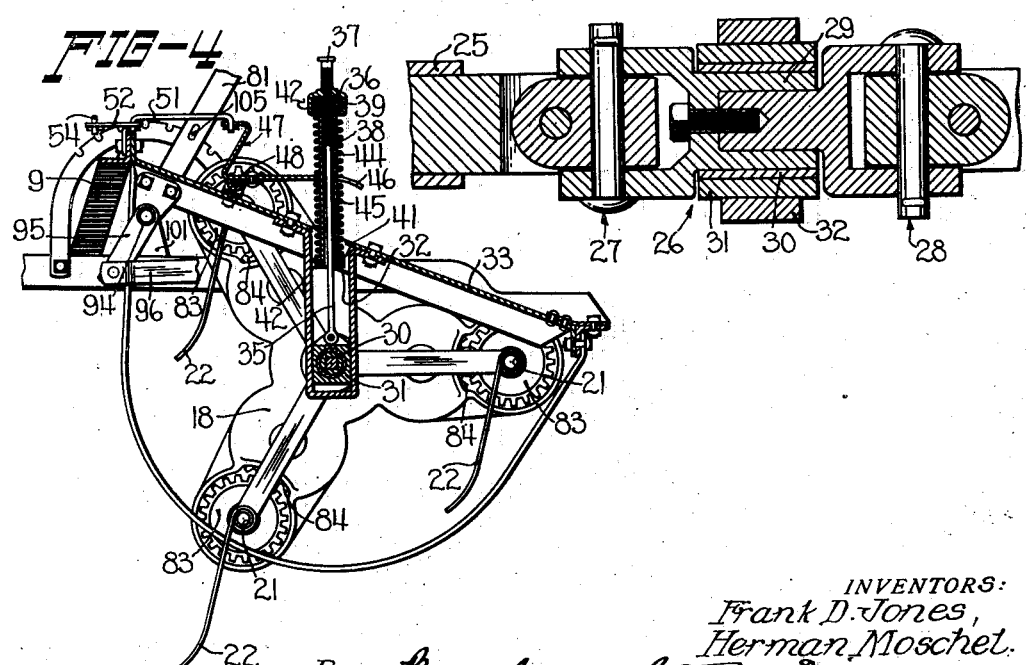
INVENTORS:
Frank D. Jones,
Herman Moschel.
ATTORNEYS.

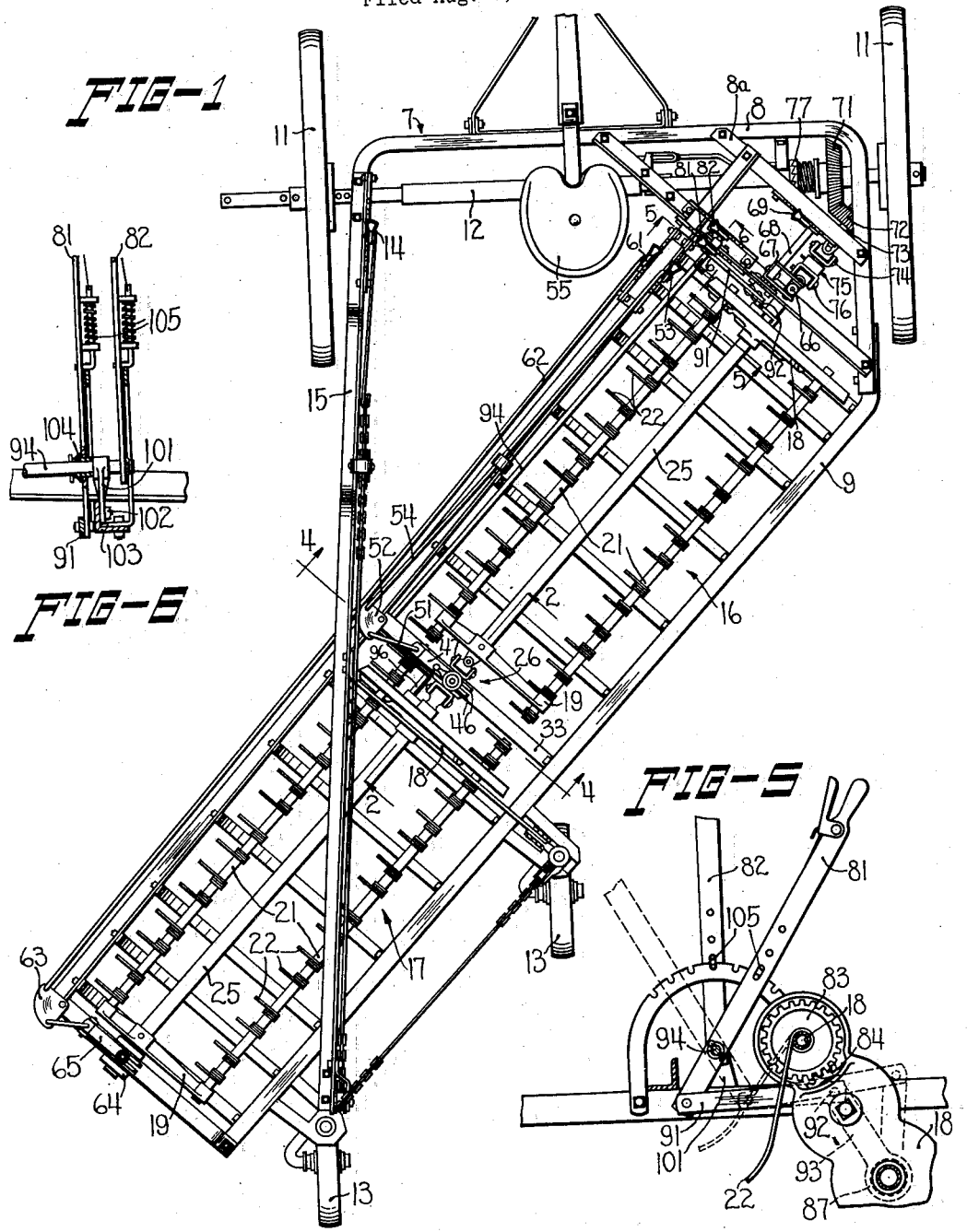

Patented June 13, 1939

2,162,506

UNITED STATES PATENT OFFICE 2,162,506

SIDE DELIVERY RAKE

Frank D. Jones and Herman Moschel, Ottumwa, Iowa, assignors to Dain Manufacturing Company of Iowa, Ottumwa, Iowa, a corporation of Iowa Application August 7, 1936, Serial No. 94,758

29 Claims. (Cl. 56—377)

The present invention relates to side delivery rakes of the type wherein a rotary reel is arranged at an angle to the line of draft, several series of rake teeth being carried by the reel and all of such teeth being driven in such relation as to be properly presented in effective working position to the hay to be raked. A rake of the general type to which this invention relates is illustrated and described in Patent No. 1,914,036, to Herman Moschel, dated June 13, 1933.

So far as we are aware, in prior rakes of this type it has been customary to make the reel carrying the spring teeth as a single rigid unit, and supporting each end of the reel in a suitable bearing carried by the frame. In such structures, when an obstruction is encountered near one end of the reel such end must be raised, and when an obstruction is encountered near the opposite end of the reel that end must be raised, and, as will be appreciated, in both such raising operations the center of the reel is also raised. Also, when an obstruction is encountered near the center of the reel it is usually necessary to raise both ends of the reel in order that the reel may clear such obstruction. This, of course, is objectionable as it results in needless effort on the part of the operator and also in loss of efficiency due to the fact that an appreciable amount of hay is missed and not raked up while the reel is so raised, this being so because of the fact that the rake is moved forward during the raising and lowering operations of the reel in order that the reel may clear the obstruction. Furthermore, such reels are usually quite long and it is difficult to accommodate the reel to the contour of the ground surface when the rake is operating over uneven ground, or along the crest or the foot of a hill. Also, in rakes of this type which are provided with but one relatively long reel, the tooth adjusting mechanism has been such as to set all of the teeth at the same angle of inclination relative to the ground surface. This setting of all of the rake teeth at the same angle is disadvantageous because the rear part of the reel must act upon double the quantity of hay that is handled by the front part of the reel in view of the fact that the rear part must not only rake up the hay in its own path but it must also transmit to the windrow the hay that is delivered into its path by the front portion of the reel.

With the above disadvantages in view, the present invention has for its principal object the provision of a rake reel constructed in a plurality of relatively movable sections that can operate in various positions with respect to each other. Specifically, it is an object of the present invention to provide a rake having a reel formed in two sections joined together at the longitudinal center of the reel frame, and to provide means for raising and lowering either end of the reel independently of the central portion thereof, and also to provide means for raising and lowering the central portion of the reel independently of the ends of the reel.

Another object of the present invention is to provide a rotary rake with a reel formed in two sections and so connected together as to rotate in unison, and wherein means is provided whereby one section of the reel may be angled, either upwardly or downwardly relative to the other section, so that, for example, when raking along the foot of a hill one section of the reel may be inclined up the hill while the other section is maintained parallel with the level ground at the foot of the hill, or when raking along the brow of a hill or along a ridge one or both sections of a hill may be set to be inclined downwardly.

A further object of the invention is to provide a two-section reel of this type with means for adjusting the inclination of the spring teeth of one section relative to the ground surface independently of the adjustment of the teeth of the other section.

Other objects and advantageous features of the present invention will be apparent from the following description of our invention taken in connection with the preferred embodiment thereof illustrated in the accompanying drawings, in which—

Figure 1 is a plan view of a side delivery rake embodying our improvements;

Figure 2 is a vertical longitudinal sectional view taken at an enlarged scale approximately on the plane of the line 2—2 of Figure 1;

Figure 3 is a fragmentary sectional view, on an enlarged scale, illustrating the universal joint connection between the two reel section supporting shafts and the bearing support therefor at the center of the reel frame, taken at an angle of 90° to that shown in Figure 2.

Figure 4 is a transverse vertical sectional view taken substantially on the plane of the line 4—4 of Figures 1 and 2;

Figure 5 is a transverse vertical sectional view taken approximately on the plane of the line 5—5 of Figure 1; and Figure 6 is a longitudinal vertical sectional view taken approximately on the plane of the line 6—6 of Figure 1.

Referring to the drawings, the frame of the machine is indicated by the reference numeral 7 and comprises the usual front section 8 and a rear or reel carrying section 9 rigidly connected together in any appropriate manner, the reel carrying section 9 extending diagonally rearwardly from the front section 8 so that the hay operated upon will be moved laterally. The front section 8 of the frame is suitably supported on a pair of carrying wheels 11, 11 mounted upon an axle 12. Such wheels and axle are connected together by any suitable means, such as ratchet mechanisms or the like, so that the axle will be caused to rotate upon the forward movement of the machine but will not rotate when the machine is backed, as is conventional in rakes of this type.

The rear reel carrying section 9 of the frame is suitably supported on laterally spaced rear caster wheels 13, 13, as shown, and the frame as a whole is suitably connected in any desired manner with the axle 12 so that when the reel frame is adjusted vertically relative to said rear caster wheels it will rock about such axle as an axis, as is also usual in machines of this type. A common operating lever 14 is provided for adjusting the frame relatively to the rear caster wheels, such lever being mounted on the long rearwardly extending truss member 15 of the frame. These adjusting devices have not been illustrated in detail and have only been briefly mentioned herein as the particular details thereof have nothing to do with our present invention, and may be of any well-known construction such as that shown, for example, in Patent No. 1,399,197, to Joseph Dain, dated December 6, 1921.

Rotatably mounted in the frame section 9 is a reel comprising two alined sections 16 and 17. Each of the reel sections 16 and 17 has inner and outer heads 18 and 19, respectively, that are connected together by a plurality of bars 21, generally three in number, each of which carries a plurality of rake teeth 22. The inner head 18 of each of the reel sections 16 and 17 has rotatably mounted therein a plurality of sets of gears, the number of sets corresponding in number to the number of tooth bars 21, and in the outer gear of each set the forward end of one of the tooth bars is secured so as to rotate therewith, as is well known in rakes of this type. The outer gear of each of the sets of gears referred to is in mesh with an idler gear that, in turn, meshes with a smaller central gear which is ordinarily held fixed against rotation during operation of the rake, but which is so mounted that it may be rotated in order to effect a change in the position of the tooth bars so as to incline the teeth carried thereby as desired. These gears and the means for rocking such central gear will be described later herein.

The central shaft upon which the heads 18 and 19 of each of the reel sections 16 and 17 are mounted is indicated by the reference numeral 25. As shown in Figures 1 and 2, the shafts 25 for the two sections are connected together at the approximate longitudinal center of the reel frame 9 by a flexible connection indicated as an entirety by the reference numeral 26. The flexible connection 26 comprises a pair of universal joints 27 and 28 (Figures 2 and 3) connected, respectively, to the shafts 25 of the reel sections 16 and 17. The universal joints 27 and 28 are coupled together to form a short shaft section 29 that is rotatably supported within a suitable sleeve bearing 30 mounted in a square bearing block 31 slidably disposed within a vertically positioned U-shaped bracket 32 carried by a cross-member 33 of the reel frame 9, as best shown in Figure 4. The bearing block 31 is suspended at the lower end of a vertically disposed rod 35, the upper end of which is threaded into a nut 36 provided with an adjusting handle 37. The rod 35 is embraced by a tubular member 38 fixed at its upper end to a collar 39 adjacent the upper end of the rod and at its lower end to a second collar 41 adjacent the lower end of the rod, said collars being fixed to the tubular member 38 by pins 42 as shown in Figure 4. Coaxially disposed upon the tubular member 38 between the two collars 39 and 41 is a pair of helical springs 44 and 45, and a forked arm 46 is inserted between the two springs with one arm disposed on either side of the tubular member 38. This lever 46 forms a part of a Z-shaped depth adjusting member 47 in the form of a bell crank which has a fulcrum bearing 48 fixed to the cross-member 33 of the frame.

It will be seen from the foregoing description of the several parts that the bearing block 31 is suspended from the adjusting nut 36 which is supported on the lever 46 by means of the spring 44, which is in compression, and that by turning the adjusting handle 37 on the nut 36 the rod may be raised or lowered to adjust the rod and the bearing block to thereby raise or lower the central portion of the reel to adjust it relative to the ground surface. The lower spring 45 is provided so as to obtain a double acting spring support for the reel. By raising or lowering the lever 46 the elevation of the universal joint between the two reel sections, or, in other words, the center of the reel as a whole, may be raised and lowered independent of the outer ends of the two sections of the reel when the center of the reel meets an obstruction.

In order to raise and lower the outer end of the arm 46 of the Z-shaped member 47 the opposite arm is connected by means of a rod 51 to a bell-crank 52 (Figures 1 and 4) which in turn is connected to a hand lever 53, conveniently located adjacent the driver's seat 55, by means of a rod 54 that extends along a side bar of the frame 9 of the rake, as shown in Figure 1. It will be seen, therefore, that when the center of the reel meets an obstruction the hand lever 53 can be manipulated to move the center bearing 30 upwardly to raise the intermediate portion of the reel, and that after the obstruction has been cleared the lever can be swung in the reverse direction to again lower the central portion of the reel.

The rear end of the reel section 17 is controlled by a second hand lever 61, which is also located adjacent the driver's seat 55, as shown in Figure 1. The lever 61 operates through a rod 62 that extends the full length of the reel frame, and a bell-crank 63 is pivotally connected to the rear end of the frame and controls the raising and lowering of the end bearing 64 by a bell-crank 65 substantially identical with the bell-crank 47 described above. Also, the end bearing 64 is spring-supported on the reel frame in a manner similar to that of the central bearing 30. It is therefore not deemed necessary to repeat herein the detail description of these parts. The bearing at the forward end of the reel section 16 is also provided with a similar spring mounting, indicated as an entirety by the reference numeral 66, which is held in a bracket 67 suitably mounted on a cross-bar of the reel frame 9 and operated through a rocking bar 68 by means of a hand lever 69, also positioned adjacent the driver's seat 55.

It will be seen from the foregoing description that the central portion of the reel may be raised and lowered independently of the ends of the reel and that each end of the reel may be raised and lowered independently of the opposite end thereof and also independently of the central portion of the reel, thus obviating the necessity of raising the entire reel to any extent when only a part of the reel meets an obstruction, and thereby eliminating to a large degree loss of hay occasioned by raising and lowering the entire reel as was necessary in prior constructions.

The shafts 25 of the two reel sections 16 and 17, connected together by the universal joint 26, are driven by power derived from the main axle 12 by the following mechanism: A bevel gear 71 is fixedly secured to said axle adjacent the inner or forward end of the reel frame 9, which gear is normally in mesh with a bevel pinion 72 suitably mounted on a stub shaft 73 journaled in a suitable bearing supported from the diagonal frame bar 8a of the frame 8 at a point adjacent to the main axle 12. A universal joint 74 is secured to the bevel pinion 72 so as to rotate therewith and has a telescopic connection, as shown at 75, with a second universal joint 76 that is connected with the inner or forward end of the shaft 25 of the reel section 16. As the shafts 25 of the two reel sections are connected together by the flexible connection 26 before described they are rotated in unison by power derived from the axle 12 through the driving mechanism just described. The gear 71, while normally held in mesh with the bevel pinion 72, may be thrown out of engagement therewith when desired by means of a suitable clutch mechanism mounted on the axle 12, which mechanism is indicated generally by the reference numeral 77. This driving mechanism is old and well-known in the art and hence it is believed that further description or illustration thereof herein is unnecessary.

In our present construction the inclination of the teeth 22 of the three tooth bars 21 of each of the reel sections 16 and 17, may be independently adjusted relative to the ground surface by means of a pair of hand levers 81 and 82, respectively, positioned adjacent the driver's seat 55. The method of making this adjustment in a single reel is well-known in the art and includes sets of gear mechanism such as those carried by the head 18 of each of the reel sections as before mentioned, and as shown in Figures 4 and 5. Fixed on each of the tooth bars 21 within the head 18 of each of the reel sections 16 and 17 is a gear 83 which is connected through an idler 84 with a central gear 85, best shown in Figure 2. This central gear, as before mentioned, is normally stationary during operation of the rake, and the shaft 25 is journaled for rotation within the hub 87 of this gear. The teeth of the rake are always maintained at a predetermined angle of inclination by means of these gear trains, the inclination of the teeth being changed as desired by rotating the normally stationary central gears 85 through a predetermined angle as is usual in such constructions. As shown in Figure 5, the hand lever 81 is pivotally mounted on a shaft 94 and is connected with the central gear 85 of the reel section 16 in such manner that movement of the lever rotates the gear. For this purpose a link 91 is connected at one end to the lower end of the lever 81 and has its other end connected as at 92, to an arm 93 fixed to the hub of the central gear 85. In Figure 5 we have shown in full lines the positions of the several parts when the teeth 22 are set at one inclination, and in dotted lines their positions when the teeth 22 are set at another inclination. The other hand lever 82 controls the teeth of the reel section 17 and is fixed to the rock shaft 94 that extends to the center of the reel frame (Figure 2) and carries an arm 95 to which a connecting link 96 is pivotally connected. The link 96 is also pivotally connected to an arm 97 fixed to the hub of the gear 85 by bolts 98, as shown in Figure 2.

In Figure 6 we have illustrated the details of supporting the two hand levers 81 and 82 on the reel frame. As there shown the lever 82 is fixed on the inner end of the rock shaft 94 which is journaled in the upper end of a bracket 101 fixed at its lower end as shown at 102 to a transverse bar 103 of the reel frame, and the lever 81 has a journal bearing 104 on the rock shaft 94. Each of the levers 81 and 82 is provided with a detent mechanism 105 for holding it in any of its several adjusted positions.

It will be seen from the foregoing description that with the present construction the inclination of the spring teeth 22 of one section of the reel can be adjusted independently of the teeth of the other section, and, therefore, that it is possible to give the teeth at one end of the reel a different inclination relative to the ground than the teeth at the other end of the reel to thereby increase the raking efficiency of the rake as a whole. For example, the teeth of the forward reel section 16 may be adjusted to throw the hay farther than the rear section 17.

While we have described above the preferred construction in which the principles of the present invention have been embodied, it is to be understood that our invention is not to be limited to the specific details shown and described, but that, in fact, widely different means may be employed in the practice of the broader aspects of our invention.

What we claim, therefore, and desire to secure by Letters Patent is:

1. In a rotary rake, the combination of a frame, a rake reel supported by said frame and comprising a plurality of sections movable relative to each other, and means on the frame for adjusting the position of each section relative to the other and to said frame.

2. In a rotary rake, the combination of a frame, a rake reel supported by said frame and comprising two relatively movable sections connected together in longitudinal alinement, and means on the frame for raising and lowering the adjacent ends of the sections relative to the opposite ends thereof.

3. In a rotary rake, the combination of a frame, a rake reel supported by said frame and comprising two relatively movable sections connected together in longitudinal alinement, means on the frame for raising and lowering the adjacent ends of the sections relative to the opposite ends thereof, and means on the frame for raising and lowering at least one of said opposite ends of said sections relative to said adjacent ends thereof.

4. In a rotary rake, the combination of a frame, a rake reel supported by said frame and comprising two relatively movable sections connected together in longitudinal alinement, means on the frame for raising and lowering the adjacent ends of the sections relative to the opposite ends thereof, and means on the frame for raising and lowering each of said opposite ends of said sections relative to said adjacent ends thereof and to each other.

5. In a rotary rake, the combination of a frame, a rake reel comprising a plurality of relatively movable sections, and means yieldingly suspending the ends of each of said sections from the frame for vertical movement with respect to said frame.

6. In a rotary rake, the combination of a frame, a rake reel comprising two relatively movable sections connected in end to end relation, and means yieldingly suspending the adjacent ends of said sections from said frame for movement relative to said frame.

7. A rotary rake including a frame, a rake reel comprising two relatively movable sections connected in end to end relation, means yieldingly suspending the adjacent ends of said sections to move vertically relative to said frame, means yieldingly suspending the other ends of said sections to move vertically relative to said frame independently of movement of said adjacent ends, and means for raising and lowering the adjacent ends of said sections relative to said frame independently of the other ends of said sections.

8. A rotary rake including a frame, a rake reel comprising two relatively movable sections connected in end to end relation, means yieldingly suspending the adjacent ends of said sections to move relative to said frame, means yieldingly suspending the other ends of said sections to move relative to said frame independently of movement of said adjacent ends, means for raising and lowering the adjacent ends of said sections relative to said frame independently of the other ends of said sections, and means for raising and lowering said other ends of said sections relative to said frame independently of the adjacent ends of said sections.

9. In a rotary rake, the combination of a frame, a rake reel comprising two relatively movable sections connected in end to end relation, means yieldingly suspending the adjacent ends of said sections from said frame so as to move relative thereto, means yieldingly suspending the other ends of said sections to move relative to said frame independently of movement of said adjacent ends, means connected with the frame for raising and lowering the adjacent ends of said sections relative to said frame independently of the other ends of said sections, and means connected with the frame for raising and lowering said other ends of said sections relative to said frame independently of the adjacent ends of said sections and independently of each other.

10. A rotary rake comprising a frame, a rake reel supported by said frame, a plurality of spring teeth carried by said reel, and means adjacent the operator's position on the frame for adjusting the inclination of certain of said teeth independently of the adjustment of the other of said teeth.

11. A rotary rake including a frame, a rake reel supported by said frame and comprising a plurality of relatively movable sections, a plurality of spring teeth carried by each of said sections, and separate means for adjusting the inclination of the teeth of each section.

12. A rotary rake comprising a frame, a rake reel, means yieldingly suspending said reel from said frame, a plurality of adjustable spring teeth carried by said reel and positioned at intervals along the length of the reel, and means for adjusting the teeth adjacent the forward end of the reel independently of the adjustment of the teeth adjacent the rear end of the reel.

13. In a rotary rake, the combination of a frame, a rake reel comprising two relatively movable sections connected in end to end relation, means yieldingly suspending the adjacent ends of said sections from said frame for movement together relative to said frame and relative to the opposite ends of the sections, spring teeth carried by each of said sections, and means for adjusting the inclination of the teeth of one section relative to the teeth of the other section.

14. The combination with a rotary rake including a frame, of a rake reel supported by said frame and comprising a plurality of relatively movable sections, and means including a universal joint between adjacent sections for causing the latter to rotate together.

15. In a rotary rake, the combination of a frame, a rake reel supported by said frame and comprising two relatively movable sections, universal joint means connecting said sections for rotation together and providing for relative movement between said sections, and means supported on the frame, for raising and lowering said universal joint means to raise and lower the adjacent ends of said sections.

16. The combination with a rotary rake including a frame, a rake reel mounted for rotation therein and for vertical movement with respect thereto, an operator's seat supported on the frame adjacent one end of the reel, of means for raising the end of the reel remote from the operator's seat relative to the frame, said means including a bell-crank pivoted to said frame and a lever mounted on the frame adjacent the operator's seat and operatively connected with said bell-crank.

17. The combination with a rotary rake including a frame, a rake reel comprising two relatively movable sections, and a plurality of spring teeth carried by each of said sections, of means for adjusting the inclination of the teeth of one section including a rock-shaft journaled on said frame and extending to said one section, and a lever fixed to said rock-shaft, and means for separately adjusting the inclination of the teeth of the other section including a lever mounted on said rock shaft for movement with respect thereto adjacent said first-mentioned lever.

18. The combination with a rotary rake including a frame, and a rake reel comprising two relatively movable sections disposed within said frame in end to end relation, each of said sections having a shaft, of a short connecting shaft disposed between the adjacent ends of said reel section shafts, means including a universal joint for connecting each end of said short shaft to one of said adjacent shaft ends, respectively, a journal bearing member for carrying said short shaft, and means for supporting said bearing member on said frame.

19. A rotary rake comprising a frame, a rake reel supported by said frame and comprising a plurality of sections, means for angling said sections relative to each other, means connecting said sections together whereby they may rotate in unison regardless of the angular positions of said sections, and means for rotating said reel.

20. A rotary rake comprising a frame, a rake reel comprising a plurality of sections, means yieldingly suspending each of said sections from said frame, means for angling said sections relative to each other, means connecting said sections together whereby they may rotate in unison regardless of the angular positions of said sections, and means for rotating said reel.

21. A rotary rake comprising a frame, a rake reel comprising a plurality of sections, means yieldingly suspending each of said sections from said frame, means for angling said sections relative to each other, means connecting said sections together whereby they may rotate in unison regardless of the angular positions of said sections, means for rotating said reel, a plurality of spring teeth carried by each of said reel sections, and separate means for adjusting the inclination of the teeth of each section.

22. The combination with a rotary rake including a frame and a rake reel comprising two relatively movable sections disposed within said frame in end-to-end relation, each of said sections having a shaft, of means connecting the adjacent ends of said reel section shafts, and resilient means reacting against said frame for supporting said connecting means and yieldingly holding the same against generally vertical movement relative to the frame.

23. The combination with a rotary rake including a frame and a rake reel comprising two relatively movable sections disposed within said frame in end-to-end relation, of means connecting the adjacent ends of said reel sections, and supporting means yieldingly restraining said connecting means against both upward and downward movement relative to said frame.

24. The combination with a rotary rake including a frame and a rake reel comprising two relatively movable sections disposed within said frame in end-to-end relation, each of said sections having a shaft, of means connecting the adjacent ends of said reel section shafts, means for supporting said connecting means on said frame comprising a supporting rod, a helical spring coaxially disposed on said rod, means connected to said rod and bearing against the upper end of said spring for resisting the thrust of said spring in an upward direction, means pivoted to said frame for supporting said connecting means by engaging the lower end of said spring, and means for adjusting said pivoted means for adjusting the elevation of said connecting means.

25. The combination with a rotary rake including a frame and a rake reel comprising two relatively movable sections disposed within said frame in end-to-end relation, each of said sections having a shaft, of means connecting the adjacent ends of said reel section shafts, means for supporting said connecting means on said frame comprising a supporting rod, a pair of helical springs coaxially disposed end-to-end on said rod, means connected to said rod and bearing against the opposite ends of said springs for resisting the thrust of said springs, means pivotally connected to said frame for supporting said connecting means by engaging said springs between the adjacent ends thereof, and means for adjusting said supporting means for adjusting the elevation of said connecting means.

26. The combination with a rotary rake including a frame and a rake reel comprising two relatively movable sections disposed within said frame in end-to-end relation, each of said sections having a shaft, of a short connecting shaft disposed between the adjacent ends of said reel section shafts, means including a universal joint for connecting each end of said short shaft to one of said adjacent shaft ends, respectively, a journal bearing member for carrying said short shaft, and means for supporting said bearing member on said frame comprising a supporting rod for said member, a pair of helical springs coaxially disposed end-to-end on said rod, means connected to said rod and bearing against the opposite ends of said springs for resisting the thrust of said springs, a crank arm pivotally supported on said frame for supporting said bearing member by engaging said springs between the adjacent ends thereof, and means for adjustably fixing the position of said arm on its pivot for adjusting the elevation of said bearing member.

27. A rotary rake comprising a frame, a rake reel, means connecting one portion of the rake reel to said frame to provide for vertical movement of said reel portion relative to said frame, and means acting between said portion and the frame for yieldingly holding said portion against upward movement relative to said frame.

28. A rotary rake comprising a frame, a rake reel, means connecting said frame with the ends of the rake reel for yieldingly suspending the latter from said frame for vertical movemet relative to said frame, and means interposed between the ends of the rake reel and the frame for yieldingly holding the ends of the rake reel against upward movement relative to said frame.

29. A rotary rake comprising a frame, a rake reel, means connecting said frame with the ends of the rake reel for yieldingly suspending the latter from said frame to move relative to said frame, means on said frame and acting through said yielding suspending means for moving the latter to adjust the ends of said rake reel relative to said frame, and means acting against the ends of the rake reel and reacting against the adjusting means for yieldingly holding the ends of the rake reel against upward movement relative to said frame.

FRANK D. JONES.
HERMAN MOSCHEL.